United States Patent
Koike et al.

(10) Patent No.: US 10,812,891 B2
(45) Date of Patent: Oct. 20, 2020

(54) SOUND OUTPUT APPARATUS AND METHOD OF EXECUTING FUNCTION OF SOUND OUTPUT APPARATUS

(71) Applicant: SONY CORPORATION, Tokyo (JP)

(72) Inventors: Ryuya Koike, Kanagawa (JP); Jo Kamada, Tokyo (JP); Issei Yamazaki, Gunma (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/330,806

(22) PCT Filed: Sep. 20, 2017

(86) PCT No.: PCT/JP2017/033985
§ 371 (c)(1),
(2) Date: Mar. 6, 2019

(87) PCT Pub. No.: WO2018/079139
PCT Pub. Date: May 3, 2018

(65) Prior Publication Data
US 2019/0238969 A1  Aug. 1, 2019

(30) Foreign Application Priority Data
Oct. 24, 2016  (JP) .................. 2016-207695

(51) Int. Cl.
*H04R 1/10* (2006.01)
*G06K 9/00* (2006.01)
*H04R 5/033* (2006.01)

(52) U.S. Cl.
CPC ....... *H04R 1/1041* (2013.01); *G06K 9/00006* (2013.01); *G06K 9/00087* (2013.01);
(Continued)

(58) Field of Classification Search
CPC .... H04R 1/1016; H04R 1/1041; H04R 5/033; H04R 2420/07; G06K 9/00006;
(Continued)

(56) References Cited

U.S. PATENT DOCUMENTS 6,282,304 B1  8/2001 Novikov et al.
6,487,662 B1  11/2002 Kharon et al.
(Continued)

FOREIGN PATENT DOCUMENTS

AU  6519998 A  10/1999
AU  6519998 A1  10/1999
(Continued)

OTHER PUBLICATIONS

Partial Supplementary European Search Report of EP Application No. 17863906.8, dated Oct. 8, 2019, 12 pages.
(Continued)

*Primary Examiner* — Jason R Kurr
(74) *Attorney, Agent, or Firm* — Chip Law Group

(57) ABSTRACT

Provided is a sound output apparatus that includes an insertion portion inserted into an earhole for outputting sound to an earhole, and a fingerprint sensor that is exposed to the outside of the earhole for detecting fingerprint information. This configuration allows even a compact apparatus to perform a desired operation in response to operations, thereby achieving miniaturization of the apparatus and improving the user's convenience.

14 Claims, 10 Drawing Sheets

(52) U.S. Cl.
CPC ......... *G06K 9/0002* (2013.01); *G06K 9/0004* (2013.01); *H04R 1/1016* (2013.01); *H04R 5/033* (2013.01); *H04R 2420/07* (2013.01)

(58) Field of Classification Search
CPC ............. G06K 9/00087; G06K 9/0002; G06K 9/0004; G06F 3/017
See application file for complete search history.

(56) References Cited

U.S. PATENT DOCUMENTS

| | | | |
|---|---|---|---|
| 8,655,000 B1 * | 2/2014 | Solum et al. ........ | H04R 25/554 381/315 |
| 9,706,304 B1 * | 7/2017 | Kelso ...................... | H04R 3/04 |
| 2009/0010461 A1 | 1/2009 | Klinghult et al. | |
| 2009/0041313 A1 | 2/2009 | Brown | |
| 2009/0087004 A1 | 4/2009 | Boguslavskij | |
| 2010/0075631 A1 | 3/2010 | Black et al. | |
| 2012/0237092 A1 * | 9/2012 | Bechtel .............. | G06K 9/00013 382/126 |
| 2013/0005303 A1 * | 1/2013 | Song .................. | A61B 5/02438 455/411 |
| 2013/0263284 A1 | 10/2013 | Black et al. | |
| 2013/0279724 A1 | 10/2013 | Stafford et al. | |
| 2016/0072558 A1 * | 3/2016 | Hirsch ................... | H04W 4/80 455/41.1 |
| 2016/0086402 A1 | 3/2016 | Black et al. | |
| 2016/0140379 A1 * | 5/2016 | Pedersen ............ | G06K 9/00919 726/19 |
| 2016/0205475 A1 * | 7/2016 | Shannnugann et al. ..................... H04R 5/033 | |
| 2017/0308182 A1 * | 10/2017 | Belverato ............ | G06F 3/0346 |
| 2017/0316192 A1 * | 11/2017 | Razouane ............ | A61B 5/1172 |

FOREIGN PATENT DOCUMENTS

| | | |
|---|---|---|
| AU | 5135000 A | 12/2000 |
| BR | 9809845 A | 6/2000 |
| CA | 2289073 A1 | 10/1999 |
| CA | 2647194 A1 | 1/2008 |
| CN | 1258364 A | 6/2000 |
| CN | 101878635 A | 11/2010 |
| CN | 104509129 A | 4/2015 |
| CN | 105848031 A | 8/2016 |
| DE | 102007046435 B3 | 1/2009 |
| EA | 199901109 A1 | 6/2000 |
| EP | 1022681 A1 | 7/2000 |
| EP | 2043389 A2 | 4/2009 |
| EP | 2163081 A1 | 3/2010 |
| EP | 2839675 A1 | 2/2015 |
| HK | 1027884 A1 | 3/2005 |
| IL | 132759 A | 8/2005 |
| JP | 2003-536121 A | 12/2003 |
| JP | 2003-536121 A1 | 12/2003 |
| JP | 2004-363671 A | 12/2004 |
| JP | 2008-182509 A | 8/2008 |
| KR | 10-2001-0012528 A | 2/2001 |
| WO | 99/50794 A | 10/1999 |
| WO | 99/050794 A1 | 10/1999 |
| WO | 2000/070542 A1 | 11/2000 |
| WO | 2008/008101 A2 | 1/2008 |
| WO | 2009/005852 A1 | 1/2009 |
| WO | 2009/023176 A1 | 2/2009 |
| WO | 2013/158996 A1 | 10/2013 |
| WO | 2017/166598 A1 | 10/2017 |

OTHER PUBLICATIONS

International Search Report and Written Opinion of PCT Application No. PCT/JP2017/033985, dated Oct. 24, 2017, 10 pages of ISRWO.

Extended European Search Report of EP Application No. 17863906.8, dated Feb. 25, 2020, 14 pages.

* cited by examiner

SOUND OUTPUT APPARATUS AND METHOD OF EXECUTING FUNCTION OF SOUND OUTPUT APPARATUS

CROSS REFERENCE TO RELATED APPLICATIONS

This application is a U.S. National Phase of International Patent Application No. PCT/JP2017/033985 filed on Sep. 20, 2017, which claims priority benefit of Japanese Patent Application No. JP 2016-207695 filed in the Japan Patent Office on Oct. 24, 2016. Each of the above-referenced applications is hereby incorporated herein by reference in its entirety.

TECHNICAL FIELD

The present disclosure relates to a sound output apparatus, a method of executing a function of the sound output apparatus, and a program.

BACKGROUND ART

In related art, in one example, Patent Literature 1 below discloses an input device having the ability to add easily a fingerprint detection and collation function to an information processing apparatus having a limited number of connection portions of peripheral equipment by allowing an IC card having the fingerprint detection and collation function to be loaded in the device body.

CITATION LIST

Patent Literature

Patent Literature 1: JP 3951920B

DISCLOSURE OF INVENTION

Technical Problem

Wearable devices such as smartwatches attached to the user's body are spreading nowadays. Given that pursuit of simplicity, portability, miniaturization, or the like of the wearable device is considered, operation portions such as buttons are assumed to become smaller and smaller, and so there is a concern that the usability is lowered as the operation portion becomes smaller.

In particular, in the sound output apparatus such as earphone device or headphone device attached to the user's ear, the operation portion has a very limited space due to the characteristics of being worn on the ear. Even with such a compact apparatus, functions implemented by the operation are various, and so it should not be at the sacrifice of the user's usability.

Thus, a desired operation is necessary to be performed in response to the operation even with a compact apparatus.

Solution to Problem

According to the present disclosure, there is provided a sound output apparatus including: an insertion portion configured to be inserted into an earhole and output sound to an earhole; and a fingerprint sensor configured to be exposed to an outside of an earhole and detect fingerprint information.

In addition, according to the present disclosure, there is provided a method of executing a function of a sound output apparatus, the method including: registering previously fingerprint information and a predetermined function in association with each other in a database; collating fingerprint information detected by a fingerprint sensor provided in the sound output apparatus configured to be inserted into an earhole with the fingerprint information registered in the database; and executing, in a case where the fingerprint information detected by the fingerprint sensor matches the fingerprint information registered in the database as a result of the collation, the predetermined function associated with the fingerprint information registered in the database.

In addition, according to the present disclosure, there is provided a program causing a computer to function as: a means for registering previously fingerprint information and a predetermined function in association with each other in a database; a means for collating fingerprint information detected by a fingerprint sensor provided in a sound output apparatus configured to be inserted into an earhole with the fingerprint information registered in the database; and a means for executing, in a case where the fingerprint information detected by the fingerprint sensor matches the fingerprint information registered in the database as a result of the collation, the predetermined function associated with the fingerprint information registered in the database.

Advantageous Effects of Invention

According to the present disclosure as described above, it is possible to perform a desired operation in response to the operation even with a compact apparatus.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
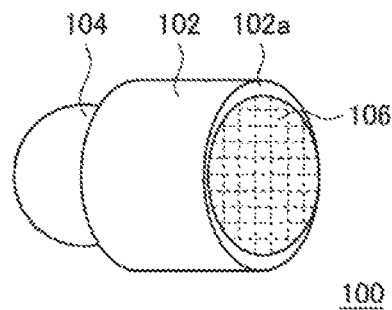
FIG. 1 is a schematic diagram illustrating a first configuration example of a sound output apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the order below.
1. Background
2. Configuration example of sound output apparatus according to present embodiment
3. Implementation of function by fingerprint detection
4. Example of function mapped to fingerprint information
5. Fingerprint authentication processing
6. Assignment for left ear and right ear of sound output apparatus
7. Combination of fingerprint information and information obtained from other device
8. Example of sound output apparatus having body portion with asymmetrical shape
9. Example of state of arrangement of fingerprint sensor on body portion
10. Functional configuration example of sound output apparatus

1. Background

A sound output apparatus such as headphone stereo cassette players including earphone devices for appreciation for music or the like is widely used. In such a sound output apparatus, there is equipment that uses buttons or a touch panel on an operation portion.

On the other hand, many earphone-shaped sound output apparatuses are compact, and when mechanical buttons are used as an operation portion, the area of the operation portion also increases as the function related to the buttons increases, which hinders miniaturization. In addition, there are cases in which buttons (touch buttons) are configured with a touch panel, but when a touch button is configured, the area increases similarly to the mechanical buttons as the function increases, which is also unsuitable for miniaturization. In addition, in a case where various functions of the sound output apparatus are implemented with a touch operation on the touch panel as UI, an area of the touch panel enough to recognize the operation is necessary, which will also hinder miniaturization.

In view of the above points, in the present embodiment, the sound output apparatus is provided with a fingerprint sensor used as an operation portion, and various functions of the sound output apparatus are implemented with a minimum space. In the case of using a fingerprint sensor, only the area of the fingerprint sensor is sufficient as the space of the operation section, so if functions are assigned to each finger, it is possible to switch the functions without increasing the area. Such a configuration is effective for reducing the space of the operation portion, particularly in a compact sound output apparatus provided with an operation portion.

2. Configuration Example of Sound Output Apparatus According to Present Embodiment FIG. 1 is a schematic diagram illustrating a first configuration example of a sound output apparatus 100 according to an embodiment of the present disclosure. As illustrated in FIG. 1, the sound output apparatus 100 includes a body portion 102, an earpiece (insertion portion) 104, and a fingerprint sensor 106. In the example illustrated in FIG. 1, the body portion 102 is formed in a cylindrical shape, and the earpiece 104 that is inserted into the user's earhole is provided at one end of the body portion 102. In addition, the fingerprint sensor 106 is provided on a top surface 102a of the body portion 102 on the side opposite to the earpiece 104.

The earpiece 104 is inserted into the user's earhole and outputs sound from a loudspeaker (not shown) to the earhole. The fingerprint sensor 106 detects fingerprint information related to a fingerprint from an image obtained by image capture. In addition, the fingerprint sensor 106 may detect the fingerprint information from electrostatic capacitance. In a case of optical detection of fingerprint information from an image, the fingerprint information is image information representing the shape of the fingerprint. In addition, in a case of electrostatic detection in which the fingerprint information is detected from electrostatic capacitance, the fingerprint information is information regarding electrostatic capacitance corresponding to convex and concave parts of a fingerprint. In addition, the fingerprint sensor 106 may detect a fingerprint using other techniques including thermal, electric field, piezoelectric, or the like. More specifically, in the optical detection, the fingerprint information is detected by placing a finger on a prism or glass surface and by capturing an image of the finger with a CCD camera or the like from the opposite side of the surface on which the finger is placed. The electrostatic detection is a way of obtaining fingerprint information based on a difference in charge amounts between mountains (parts where the skin forming a fingerprint pattern is raised) and valleys of a fingerprint when a finger is pressed against the fingerprint sensor 106. The thermal detection is a way of obtaining fingerprint information from detection of a temperature difference between a temperature (body temperature) of a mountain portion and a temperature of a valley (air temperature) of a fingerprint coming into contact with the surface of the fingerprint sensor 106. The electric field detection is a way of using, as fingerprint information, a distribution pattern produced from a difference in intensity of electric field between a peak portion and a valley portion of a fingerprint, which is generated by a weak current flowing on the surface of a finger.

Figure 2:
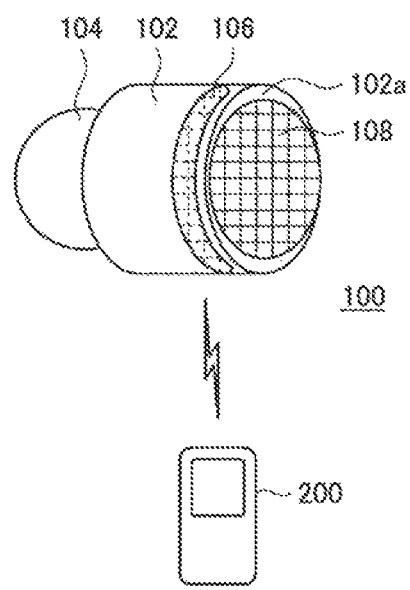
FIG. 2 is a schematic diagram illustrating a second configuration example of the sound output apparatus according to the present embodiment.

FIG. 2 is a schematic diagram illustrating a second configuration example of the sound output apparatus 100 according to the present embodiment. In the second configuration example, the fingerprint sensor 106 is provided on the side face of the cylinder of the body portion 102. In addition, a communication antenna 108 is provided on the top surface 102a of the body portion 102 on the side opposite to the earpiece 104. The communication antenna 108 communicates with a main body device 200 that transmits speech information to the sound output apparatus 100 using communication schemes such as Bluetooth (registered trademark). This makes it possible for the sound output apparatus 100 to receive speech information transmitted from the main body device 200 and for the earpiece 104 to output sound, thereby configuring the sound output apparatus 100 as a wireless earphone. Moreover, the sound output apparatus 100 may be an integral device provided with only earphone portion having necessary components such as memory, CPU, or battery.

Figure 3:
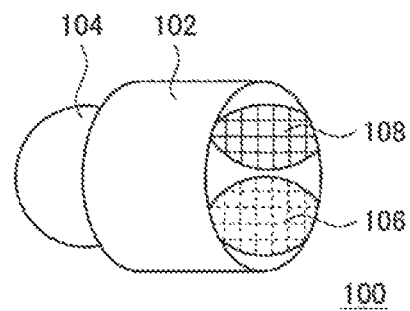
FIG. 3 is a schematic diagram illustrating a third configuration example of the sound output apparatus according to the present embodiment.

FIG. 3 is a schematic diagram illustrating a third configuration example of the sound output apparatus 100 according to the present embodiment. In the third configuration example, the communication antenna 108 is provided on the top surface 102a together with the fingerprint sensor 106.

As illustrated in FIGS. 1 to 3, in the present embodiment, the fingerprint sensor 106 is provided at a position that is easily touched with a finger. From the viewpoint of convenience, the fingerprint sensor 106 is necessary to be exposed to the outside so that a finger touches it when the earpiece 104 is attached to the earhole. In addition, as illustrated in FIGS. 2 and 3, in the case where the sound output apparatus 100 is equipment provided with a communication device, it is desirable to arrange the fingerprint sensor 106 at a position that it avoids the communication antenna 108 to avoid interference. The configuration of FIG. 2 is more advantageous to avoid communication interference than the configuration of FIG. 3 in which the communication antenna 108 and the fingerprint sensor 106 are arranged on the same face (the top surface).

3. Implementation of Function by Fingerprint Detection

Figure 4:
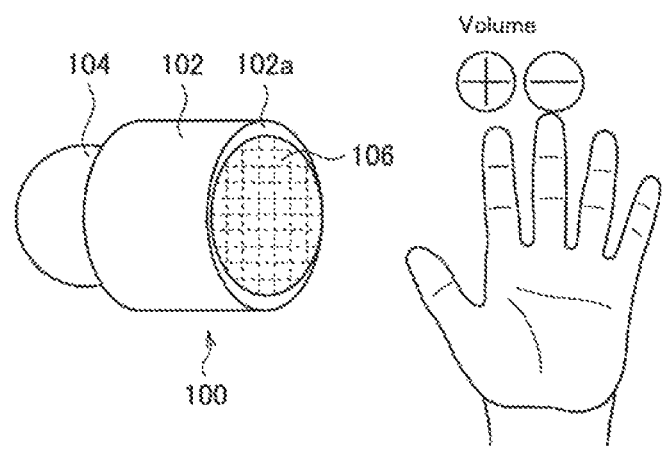
FIG. 4 volume-up of the loudness is assigned to the index finger and volume-down is assigned to the middle finger.

The sound output apparatus 100 previously registers the fingerprint information regarding the user's fingerprint and the functions of the sound output apparatus 100 corresponding to the fingerprint information in association with each other. Specifically, the function to be implemented is assigned to the fingerprint information of the finger that to be registered. This makes it possible to assign ten functions to ten fingers of both hands in association with each other. In one example, as illustrated in FIG. 4, a volume up function is assigned to an index finger and a volume down function is assigned to a middle finger. This allows the sound output apparatus 100 to turn the volume up in a case where the user's index finger touches the fingerprint sensor 106 and to turn volume down in a case where the user's middle finger touches the fingerprint sensor 106. Thus, the user is able to adjust the volume with two fingers.

Figure 5:
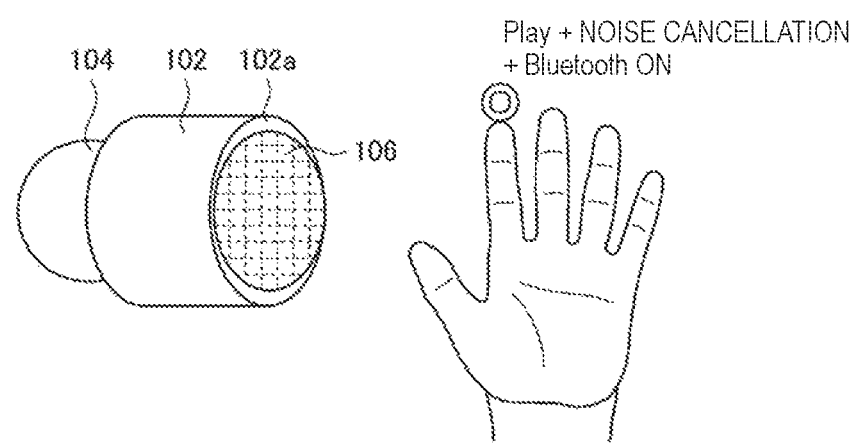
FIG. 5 is a schematic diagram illustrating an example in which speech playback start is assigned to the index finger, and turning on of a noise cancellation function and turning on of Bluetooth (registered trademark) are assigned.

Moreover, not only operations related to music playback but also functions for setting sound field or other functions can be assigned. Furthermore, it is possible to set simultaneously different functions with one finger. FIG. 5 illustrates an example in which speech playback start (Play) is assigned to the index finger, and turning on of a noise cancellation function and turning on of Bluetooth (registered trademark) are assigned. According to the example of FIG. 5, when the user's index finger touches the fingerprint sensor 106, the speech playback is started, and the noise cancellation function is turned on and Bluetooth (registered trademark) is turned on. Thus, previous registration of the fingerprint of the index finger and these functions in association with each other makes it possible for the user to implement a plurality of functions at the same time by merely touching the fingerprint sensor 106 with the index finger.

4. Examples of Function Mapped to Fingerprint Information

An example of functions of the sound output apparatus 100 that can be mapped to the fingerprint information of the finger is now described. Moreover, the functions described below are merely examples, and other functions may be mapped to fingerprint information.

Examples of a musical piece playback operation include as follows.
Playback/Pause (Play/Pause)
FF/FR
Volume up/Volume down (Vol+/Vol−)
Power on (Power)
Repeat function
Hold function (Hold)
Back/Up/Down
Shuffle function
Fast forward/Rewind
A-B repeat
Examples of the sound field setting include as follows.
Source direct function/Equalizer
Noise cancellation
Switching external sound monitor
Automatic volume limiter system (AVLS) function
Examples of file operations include as follows.
Favorite function (Bookmark function) Play/Register
Folder feed/Return
Menu/Home function
Back
Switching playback of album and playlist (for not showing display)
Examples of operations to cooperate with other functions include as follows.
Microphone/Call
Recording
Speech input
Camera shutter
Sensor On/Off
Inter-device authentication
Operation mode switching
Training button
Music share button
Notice (battery remaining amount, music title, mail, schedule, etc.)
Examples of operations related to other functions include as follows.
Pairing between wireless devices
Reset/Set initialization
Personal authentication (earphone type)

5. Fingerprint Authentication Processing

Figure 6:
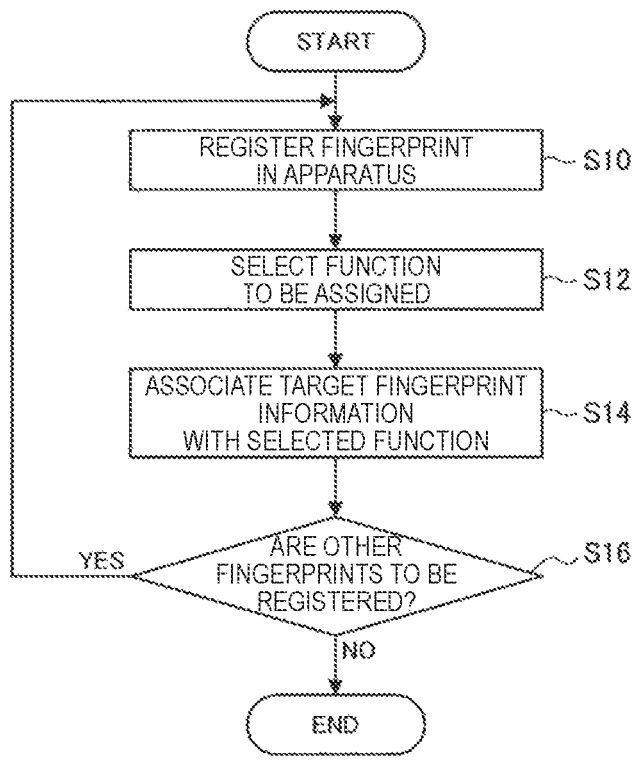
FIG. 6 is a schematic diagram illustrating processing of registering a fingerprint and a function in association with each other.

FIG. 6 is a schematic diagram illustrating processing of registering a fingerprint in association with a function. A fingerprint is first registered in a memory (a fingerprint database 116 to be described later) of the sound output apparatus 100 in step S10. Moreover, registration of a fingerprint is not limited to registration in the sound output apparatus 100. Specifically, fingerprint information detected on the side of the sound output apparatus 100 including the earpiece 104 may be transmitted to other devices (the main body device 200 such as smartphone, cloud server, etc.), and fingerprint information may be registered on the other device side. In the next step S12, a function to be assigned to the fingerprint registered in step S10 is selected. In the next step S14, the fingerprint information of the fingerprint registered in step S10 and the function selected in step S12 are associated with each other and are registered in the memory of the sound output apparatus 100. In the next step S16, it is determined whether or not to register other fingerprints as well. In a case where they are to be registered, the processing of step S10 and the subsequent steps is performed again. On the other hand, in a case where other fingerprints are not necessary to be registered, the processing ends (END).

Figure 7:
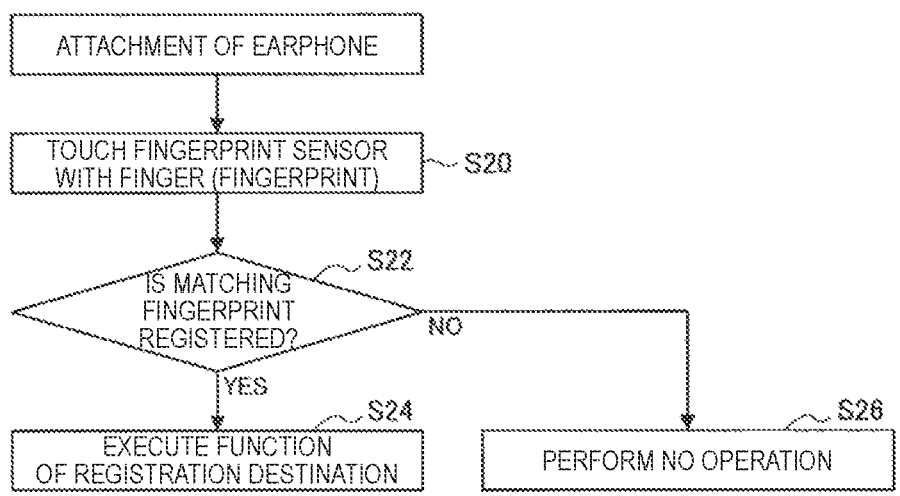
FIG. 7 is a flowchart illustrating processing of executing a function on the basis of a fingerprint.

FIG. 7 is a flowchart illustrating processing of executing a function on the basis of a fingerprint. When the user wears the sound output apparatus 100 to the ear, in step S20, the user first touches the fingerprint sensor 106 with the finger (fingerprint). This allows the fingerprint information to be detected by the fingerprint sensor 106. In the next step S22, it is determined whether or not a fingerprint that matches the information regarding the detected fingerprint is registered in the memory, and if it is registered, it proceeds to step S24. In step S24, the function associated with the registered fingerprint is executed. On the other hand, if it is determined in step S22 that a fingerprint matching the information regarding the detected fingerprint is not registered, the processing proceeds to step S26. In a case where the processing proceeds to step S26, the function of the sound output apparatus 100 is not executed. In a case where a fingerprint is registered in another device other than the sound output apparatus 100, the fingerprint information detected by the sound output apparatus 100 is transmitted to the other device side to perform the fingerprint authentication, and the authentication result is transmitted to the sound output apparatus 100.

6. Assignment for Left Ear and Right Ear of Sound Output Apparatus

In earphones for ordinary stereo speech, portions for the left ear and for the right ear are predetermined, and the user inserts an earphone for the left ear into the left ear and inserts an earphone for the right ear into the right ear while looking at a mark on the earphones. However, this method is necessary for the user to check whether they are intended for the left ear or the right ear before inserting the earphones into the earholes, resulting in troublesome work. In the present embodiment, in setting the functions of the left and right sound output apparatuses 100 on the basis of fingerprint information, it is possible to set whether it outputs left speech or right speech. More specifically, the function of outputting speech for the left ear is set to the sound output apparatus 100 touched by the left-hand fingerprint, and the function of outputting speech for the right ear is set to the sound output apparatus 100 touched by the right-hand fingerprint. Thus, the user inserts the sound output apparatuses 100 into the left and right ears, and simply touches the fingerprint sensor 106 of the sound output apparatus 100 inserted into the left ear with the left-hand finger or touches fingerprint sensor 106 of the sound output apparatus 100 inserted into the right ear with the right-hand finger. This makes it possible for the left and right sound output apparatuses 100 to output the speech for the left ear and the speech for the right ear to the left ear and the right ear, respectively. Thus, in inserting the sound output apparatuses 100 into the left and right ears, it is not necessary to be conscious of whether each of the two sound output apparatuses 100 is intended for left or right ear, thereby eliminating complicated operations.

Figure 8:
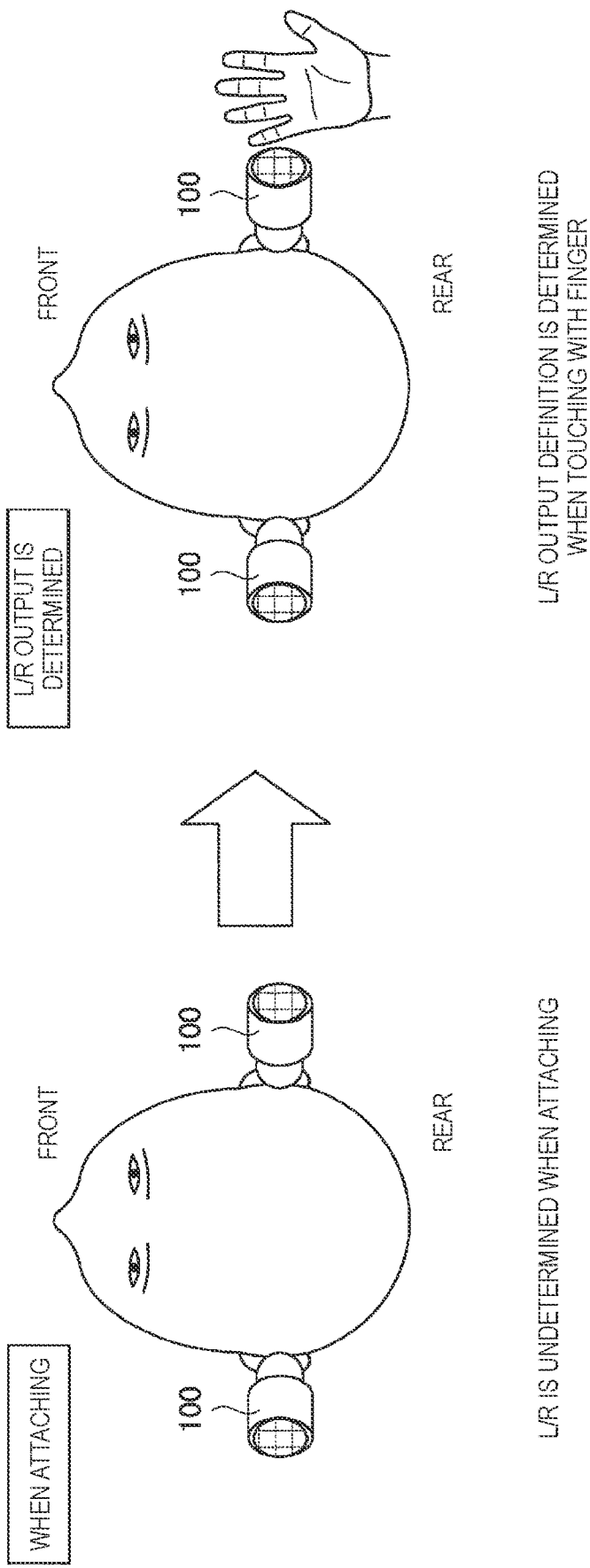
FIG. 8 is a schematic diagram illustrating how to set the outputs of the left and right sound output apparatuses to speech for the left ear and speech for the right ear respectively by the user touching the sound output apparatus with the finger.

FIG. 8 is a schematic diagram illustrating how to set the outputs of the left and right sound output apparatuses 100 to the speech for the left ear and the speech for the right ear respectively by the user touching the sound output apparatus 100 with the finger. Specifically, first, as shown in the diagram on the left side of FIG. 8, it is assumed that, when the sound output apparatuses 100 are attached to the respective ears, the apparatus for the left ear and the apparatus for the right ear are initially undetermined. From this state, as shown in the diagram on the right side of FIG. 8, if the user touches the sound output apparatus 100 of the right ear with the right hand and matches any information regarding the right-hand fingerprint registered in the sound output apparatus 100, the sound output apparatus 100 attached to the right ear is set as an entity that outputs the speech for the right ear. The sound output apparatus 100 attached to the left ear is necessarily set as an entity that outputs the speech for the left ear. This makes it unnecessary to be conscious of whether the earphone device is intended for the left ear or for the right ear, thereby greatly enhancing the user's convenience.

Figure 9:
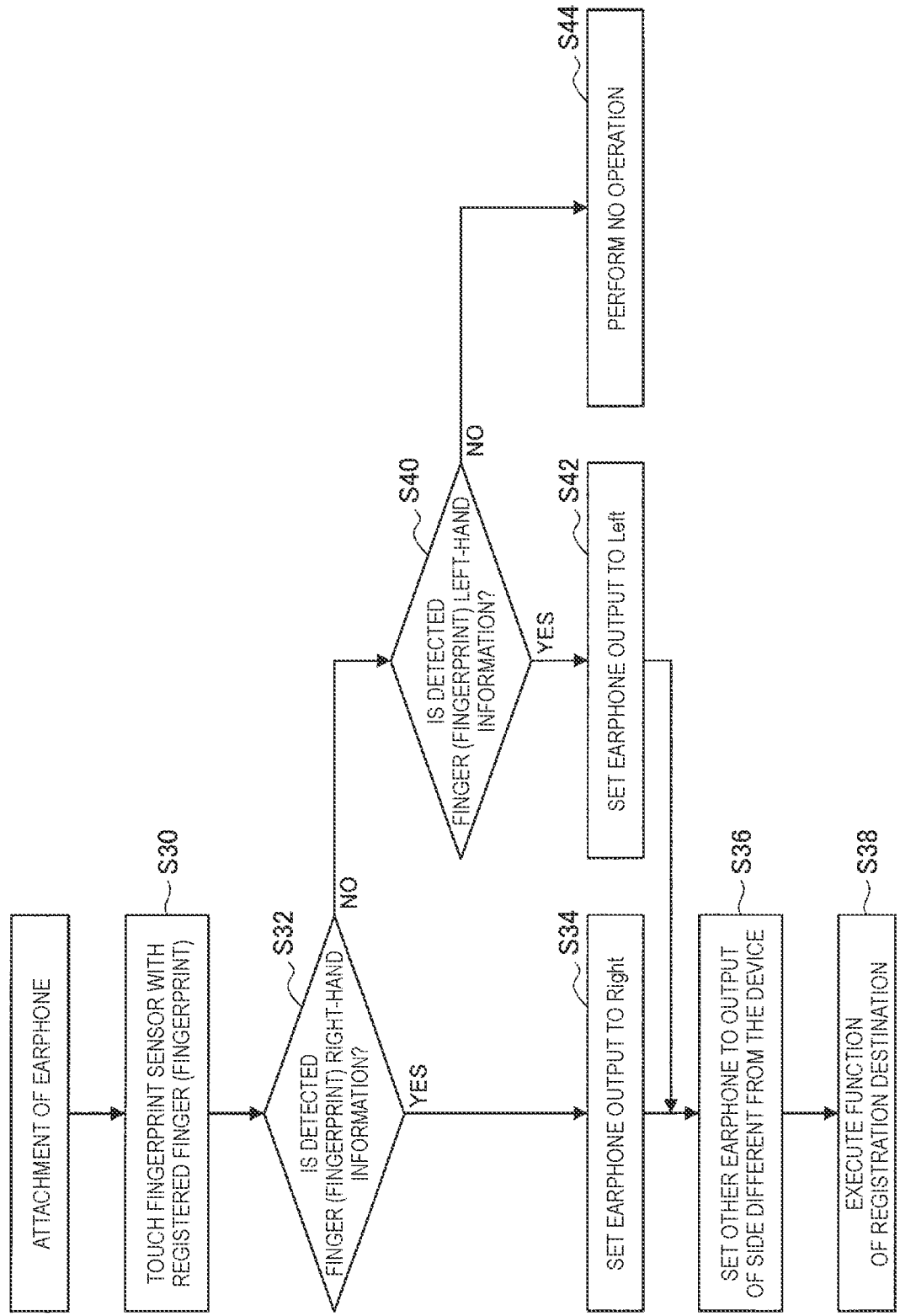
FIG. 9 is a flowchart illustrating processing of setting whether the sound output apparatus outputs speech for the left ear or speech for the right ear on the basis of a result obtained by detection of a fingerprint sensor.

FIG. 9 is a flowchart illustrating processing of setting whether the sound output apparatus 100 outputs the speech for the left ear or the speech for the right ear on the basis of a detection result by the fingerprint sensor 106. First, in step S30, the user touches one of the fingerprint sensors 106 of the two sound output apparatuses 100 attached to the left and right ears with the finger (fingerprint). This allows the fingerprint sensor 106 to detect the information regarding the fingerprint. In the next step S32, it is determined whether or not the finger (fingerprint) detected in step S30 is the registered right-hand information, and in the case where it is the right-hand information, the processing proceeds to step S34. In step S34, the output of the sound output apparatus 100 touched in step S30 is set for the right ear (Right). In the next step S36, the output of the sound output apparatus 100 that is not the sound output apparatus 100 touched in step S30 is set for the left ear. After step S36, the processing proceeds to step S38 to execute the function of the registration destination.

Further, in a case where it is determined in step S32 that the finger (fingerprint) detected in step S30 is not the registered right-hand information, the processing proceeds to step S40. It is determined in step S42 whether or not the finger (fingerprint) detected in step S30 is the registered left-hand information, in a case where it is the registered left-hand information, the processing proceeds to step S42. In step S42, the output of the sound output apparatus 100 touched in step S30 is set for the left ear (Left). In the next step S36, the output of the sound output apparatus 100 that is not the sound output apparatus 100 touched in step S30 is set for the right ear. If it is determined in step S40 that the finger (fingerprint) detected in step S30 is not the registered left-hand information, the processing proceeds to step S44 and no operation is performed.

As described above, according to the processing of FIG. 9, the speech for the right ear is output from the sound output apparatus 100 touched with the right hand, and the speech for the left ear is output from the other sound output apparatus 100. In addition, the speech for the left ear is output from the sound output apparatus 100 touched with the left hand, and the speech for the right ear is output from the other sound output apparatus 100. Thus, it is unnecessary to be conscious of whether the sound output apparatus 100 is intended for the left ear or for the right ear, thereby greatly enhancing the user's convenience.

7. Combination of Fingerprint Information and Information Obtained from Other Device Further, the combination of another device that distinguishes left and right entities makes it possible to discriminate the left and right with higher accuracy. The approach illustrated in FIG. 9 is based on the assumption that the user's left hand touches the sound output apparatus 100 attached to the left ear or the user's right hand touches the sound output apparatus 100 attached to the right ear. Thus, if there is a case where the user's left hand touches the sound output apparatus 100 attached to the right ear, a situation in which the speech for the left ear is output from the sound output apparatus 100 attached to the right ear may occur.

Figure 10:
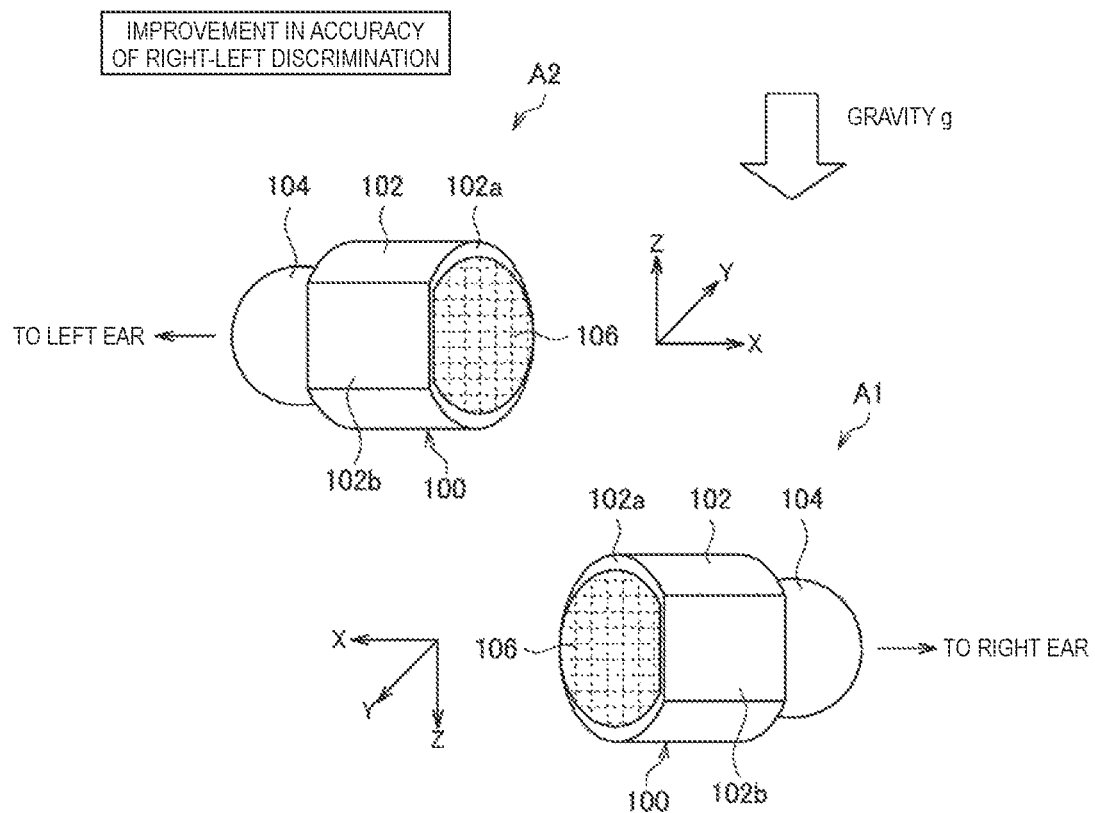
FIG. 10 is a schematic diagram illustrating a case where the sound output apparatus has a gravity sensor.

FIG. 10 illustrates a case where the sound output apparatus 100 includes a gravity sensor. As illustrated in FIG. 10, a flat surface 102b is provided on a part of the side face of the cylindrical body portion 102, and it is previously assumed that the flat surface 102b is mounted to face the front of the user. When the sound output apparatus 100 is attached to the right ear in the direction indicated by the arrow A1, the direction of gravity detected by the gravity sensor is the positive direction of the Z-axis. Assuming that the direction indicated by the arrow A1 is a proper attachment position, when the sound output apparatus 100 is attached to the left ear with 180° upside down inverted as shown by the arrow A2, the flat surface 102b faces the front the user in appearance. However, the direction of gravity detected by the gravity sensor is the negative direction of the Z-axis, so the fact that the sound output apparatus 100, which is originally necessary to be attached to the right ear, is attached to the left ear, is attached to the left ear can be discriminated from the values detected by the gravity sensor.

According to the sound output apparatus 100 including the gravity sensor as illustrated in FIG. 10, it is possible to discriminate whether each of the two sound output apparatuses 100 is attached to either the left ear or the right ear on the basis of the direction of gravity detected by the gravity sensor. Thus, in one example, in a case where the user touches the fingerprint sensor 106 of the sound output apparatus 100 attached to the right ear with the fingerprint of the left hand, if the discrimination is performed only with the fingerprint sensor 106, the sound output apparatus 100 attached to the right ear will be determined to be attached to the left ear. In such a case, the combination with the determination by the gravity sensor makes it possible to determine that the sound output apparatus 100 attached to the right ear is regarded as being attached to the right ear, thereby reliably outputting the speech for the right ear from the sound output apparatus 100 attached to the right ear.

In the sound output apparatus 100 including the gravity sensor, as described above, in a case where there is no agreement such as "the flat surface 102b is mounted so that is faces the front of the user", the discrimination of whether it is attached to the left ear or the right ear is failed to be performed. In other words, even in the sound output apparatus 100 including the gravity sensor, the body portion 102 is not symmetrical shape like a complete cylinder, but is asymmetrical, it is necessary to determine some agreement in the shape and attachment direction.

Figure 11:
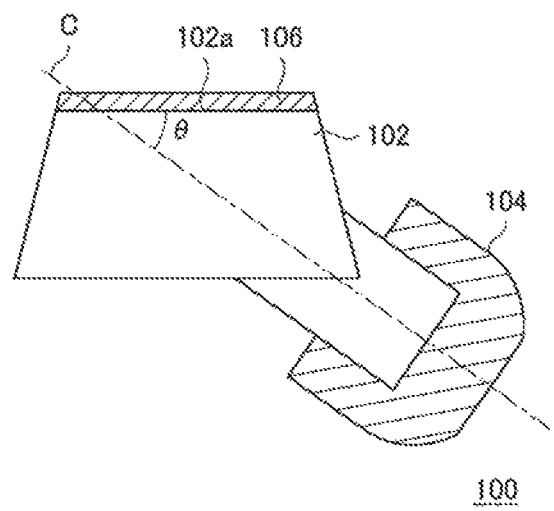
FIG. 11 is a schematic diagram illustrating an appearance of a sound output apparatus having a body portion with asymmetrical shape.
Figure 12:
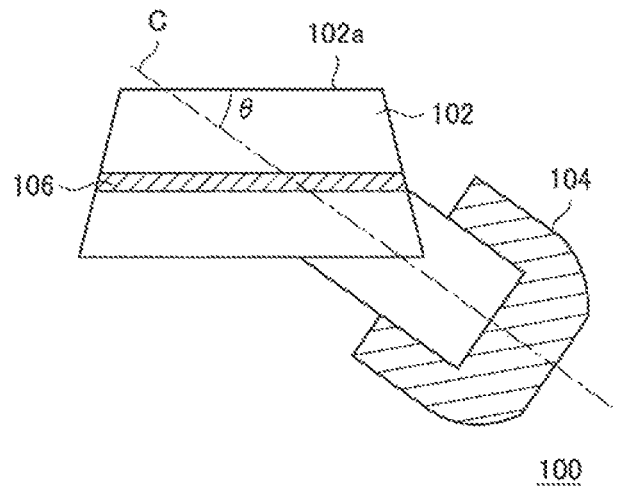
FIG. 12 is a schematic diagram illustrating an appearance of a sound output apparatus having a body portion with asymmetrical shape.
Figure 13:
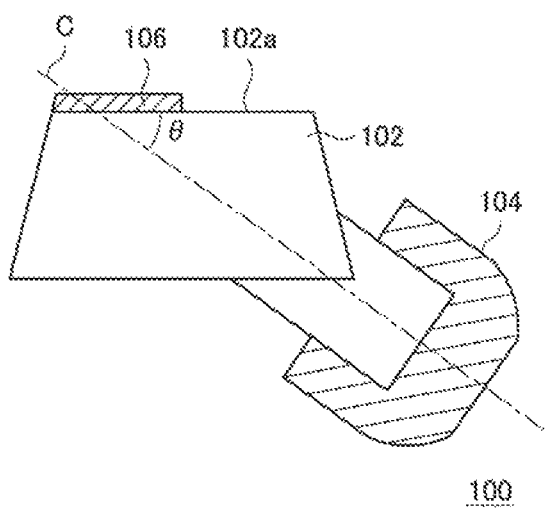
FIG. 13 is a schematic diagram illustrating an appearance of a sound output apparatus having a body portion with asymmetrical shape.

8. Example of a Sound Output Apparatus Having Body Portion with Asymmetrical Shape FIGS. 11 to 13 are schematic diagrams illustrating the external appearance of the sound output apparatus 100 having the body portion 102 with asymmetrical shape. In the examples illustrated in FIGS. 11 to 13, the angle θ between the top surface 102a and a central axis C of the earpiece 104 is not 90°, and the top surface 102a is inclined by an angle θ with respect to the central axis C. This allows the sensor surface of the fingerprint sensor 106 not to be orthogonal to the central axis C in the configuration shown in FIGS. 11 to 13, although the sensor surface of the fingerprint sensor 106 is orthogonal to the central axis of the earpiece 104 in the configuration shown in FIG. 1. As an example, the sound output apparatus 100 is attached so that the top surface 102a faces behind the user. Even in the sound output apparatus 100 provided with the body portion 102 asymmetrical with respect to the central axis C as described above, the fingerprint sensor 106 is arranged at a position exposed to the surface so that the finger touches the earpiece 104 when the earpiece 104 is attached to the earhole. FIG. 11 illustrates an example in which the fingerprint sensor 106 is provided on the top surface 102a. FIG. 12 illustrates an example in which the fingerprint sensor 106 is provided on the side surface of the body portion 102. FIG. 13 illustrates an example in which the fingerprint sensor 106 is provided on a part of the top surface 102a of the body portion. In the case of FIG. 13, it is possible to provide the communication antenna 108 on the top surface 102a, which is similar to FIG. 3.

9. Example of Arrangement of Fingerprint Sensor on Body Portion

Figure 14:
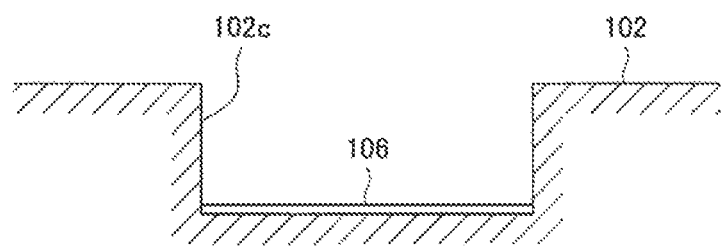
FIG. 14 is a schematic diagram illustrating a state in which the arrangement of a fingerprint sensor on a body portion.
Figure 15:
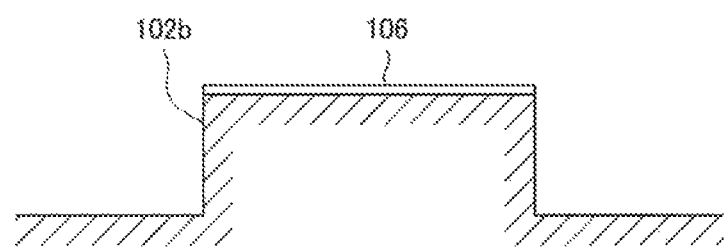
FIG. 15 is a schematic diagram illustrating a state in which the arrangement of a fingerprint sensor on a body portion.
Figure 16:
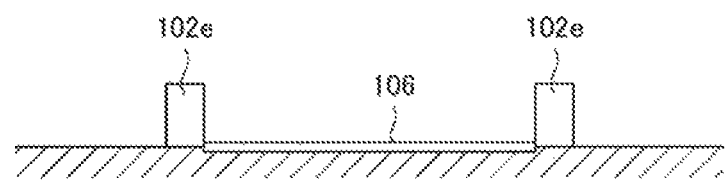
FIG. 16 is a schematic diagram illustrating a state in which the arrangement of a fingerprint sensor on a body portion.

FIGS. 14 to 16 are schematic diagrams illustrating a state of arrangement of the fingerprint sensor 106 on the body portion 102. FIG. 14 illustrates an example in which the fingerprint sensor 106 is embedded in a concave portion 102c of the body portion 102. According to the configuration illustrated in FIG. 14, when the user's finger touches the vicinity of the fingerprint sensor 106, the user is able to recognize the position of the fingerprint sensor 106 by touching the concave portion 102c. Thus, it is possible to place reliably the finger on the fingerprint sensor 106.

Further, FIG. 15 illustrates an example in which the fingerprint sensor is arranged on a convex portion 102d of the body portion 102. According to the configuration illustrated in FIG. 15, when the user's finger touches the vicinity of the fingerprint sensor 106, the user is able to recognize the position of the fingerprint sensor 106 by touching the convex portion 102d. Thus, it is possible to place reliably the finger on the fingerprint sensor 106.

Further, FIG. 16 illustrates an example in which convex portions 102e are provided around the fingerprint sensor 106 provided in the body portion 102. The convex portion 102e may be integral with the body portion 102 or may be configured as a separate part from the body portion 102. According to the configuration illustrated in FIG. 16, when the user's finger touches the vicinity of the fingerprint sensor 106, the user is able to recognize the position of the fingerprint sensor 106 by touching the convex portion 102e. Thus, it is possible to place reliably the finger on the fingerprint sensor 106. Furthermore, another sensor used to detect a finger may be provided on the convex portion 102e.

10. Functional Configuration Example of Sound Output Apparatus

Figure 17:
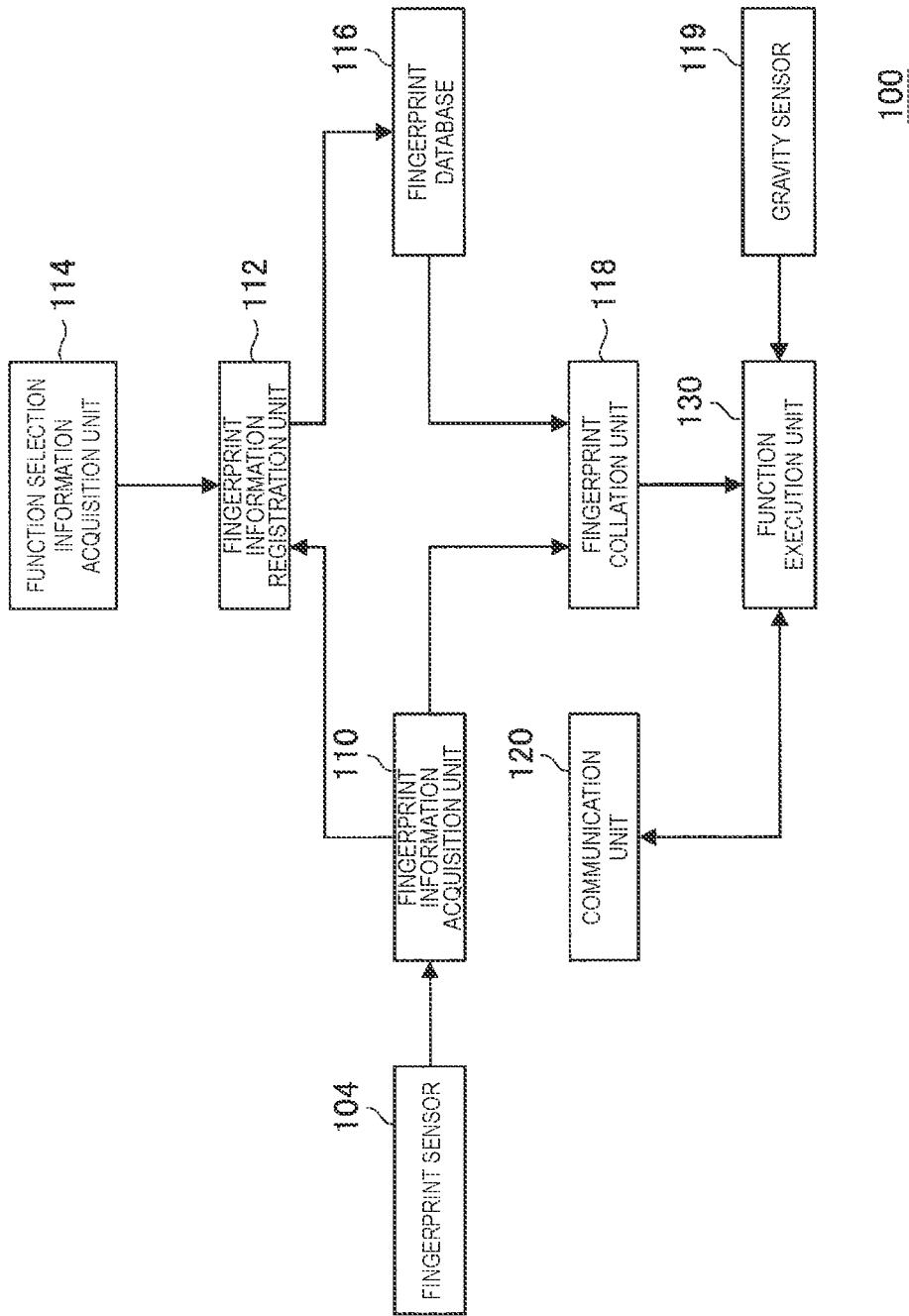
FIG. 17 is a block diagram illustrating a functional configuration of a sound output apparatus.

FIG. 17 is a block diagram illustrating a functional configuration of the sound output apparatus 100. As illustrated in FIG. 17, the sound output apparatus 100 includes a fingerprint sensor 104, a fingerprint information acquisition unit 110, a fingerprint information registration unit 112, a function selection information acquisition unit 114, a fingerprint database 116, a fingerprint collation unit 118, a gravity sensor 119, a communication unit 120, and a function processing unit 130. Moreover, each component illustrated in FIG. 17 can be constituted by hardware or central processing unit such as CPU and a program (software) for making it function. In this case, the program can be stored in a recording medium such as a memory included in the sound output apparatus 100 or a memory connected from the outside.

In FIG. 17, the fingerprint information acquisition unit 110 acquires fingerprint information from the fingerprint sensor 104. In step S10 of FIG. 6, the fingerprint information registration unit 112 registers the fingerprint information in the fingerprint database 116. In addition, the fingerprint information registration unit 112 associates the registered fingerprint information of the fingerprint with the function and registers it in the fingerprint database 116 in step S12 of FIG. 6. The function selection information acquisition unit 114 acquires information regarding the function selected for assignment to the registered fingerprint in step S12 of FIG. 6. The function selection information acquisition unit 114 acquires information regarding the function selected by the user operating the operation portion provided in the sound output apparatus 100 or the main body device 200.

The fingerprint collation unit 118 collates the fingerprint information detected by the fingerprint sensor 106 with the fingerprint information registered in the fingerprint database 116, and determines whether or not the fingerprint information matching the fingerprint information detected by the fingerprint sensor 106 is registered in the fingerprint database 116 in step S22 of FIG. 7. In a case where the fingerprint information matching the fingerprint information detected by the fingerprint sensor 106 is registered in the fingerprint database 116, the function processing unit executes the function associated with the registered fingerprint information in step S24 of FIG. 7.

The communication unit 120 communicates with the main body device 200 or the other sound output apparatus 100 and shares information with the main body device 200 or the other sound output apparatus 100. The communication can be either wireless or wired. In a case where wireless communication is performed, the communication unit 120 communicates with the main body device 200 or the other sound output apparatus 100 through the communication antenna 108. Moreover, the other sound output apparatus 100 is the other one of the sound output apparatuses 100 inserted into the left and right ears. In one example, when one of the sound output apparatuses 100 is set for the right ear in step S34 of FIG. 9, in the next step S36, the other sound output apparatus 100 recognizes that one of the sound output apparatuses 100 is set for the right ear through the communication unit 120, then the other sound output apparatus 100 is set for the left ear. The function execution unit 130 performs the setting for the left ear or the right ear. The sound output apparatus 100 set for the left ear receives information regarding the speech for the left ear from the main body device 200, and the sound output apparatus 100 set for the right ear receives information regarding the speech for the right ear from the main body device 200.

Figure 18:
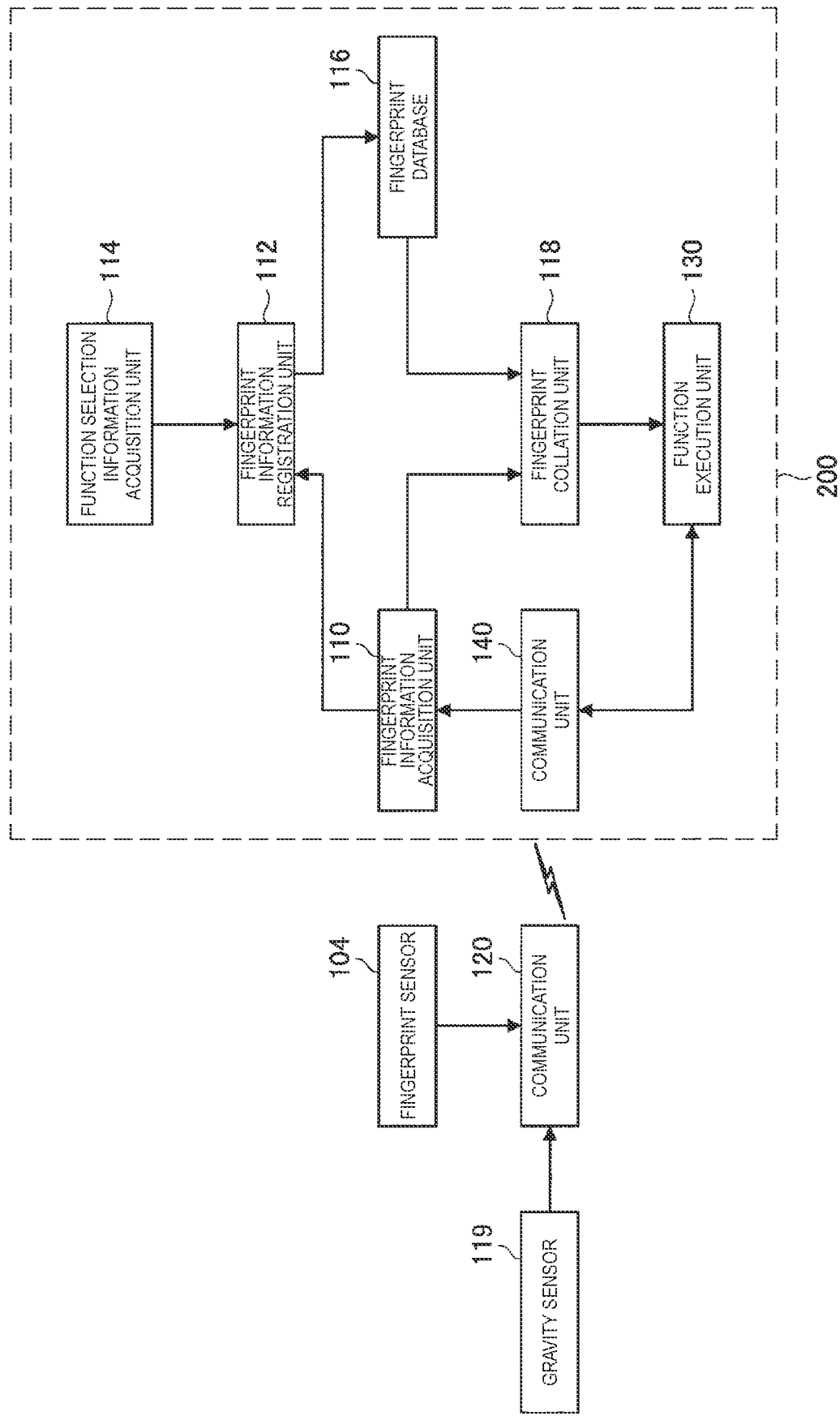
FIG. 18 is a schematic diagram illustrating an example in which the sound output apparatus includes a fingerprint sensor and a communication unit and the other components are arranged on the side of a main body device.

Among the components illustrated in FIG. 17, the fingerprint sensor 104, the gravity sensor 119, and the communication unit 120 can be included in the sound output apparatus 100, and the other components can be included in the main body device 200. The configuration in this case is illustrated in FIG. 18. A communication unit 140 provided in the main body device 200 communicates with the communication unit 120 of the sound output apparatus 100 by wireless or wired communication. The fingerprint information acquisition unit 110 provided in the side of the main body device 200 acquires fingerprint information through the communication units 120 and 140, and the main body device 200 performs various processing including registration, collation, function execution, or the like of the fingerprint information.

As described above, according to the present embodiment, the fingerprint sensor 106 is provided on the sound output apparatus 100 attached to the earhole, and the fingerprint information and the function of the sound output apparatus 100 are registered previously in association with each other. Then, when the user touches the fingerprint sensor 106, if it matches the registered fingerprint information, the function associated with the registered fingerprint information can be executed. This makes it possible for the user to implement the desired function only by touching the finger on the fingerprint sensor 106, thereby improving greatly the user's convenience.

Further, the user is freely able to set functions, so the universal design of the sound output apparatus 100 becomes possible, and the functions can be enabled for both right-handed and left-handed. In addition, the miniaturization of the fingerprint sensor 106 that is the operation portion makes it possible to achieve the simplification of operations and multi-functioning. In addition, there is no operation to search for a function button, and the function can be executed by touching the same position typically, so the usability can be remarkably improved.

Furthermore, the operation can be recognized only with the fingerprint sensor 106, so the space for the operation can be minimized, which makes the sound output apparatus 100 compact. In addition, the fingerprint authentication makes it possible to prevent the use by other persons, and security can be greatly improved. In addition, the user is able to execute the function only by touching the fingerprint sensor 106, so it is possible to minimize the operation sound, thereby greatly enhancing the quietness as compared with the operation of tapping or flicking.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, in the embodiment described above, the earphone type sound output apparatus is exemplified, but the present technology is not limited to this example. In one example, it may be applied to an overhead type headphone as a sound output apparatus.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A sound output apparatus including:

an insertion portion configured to be inserted into an earhole and output sound to an earhole; and a fingerprint sensor configured to be exposed to an outside of an earhole and detect fingerprint information.

(2)

The sound output apparatus according to (1), including:

a body portion extending from the insertion portion and configured to be exposed to an outside of an earhole, in which the fingerprint sensor is provided in the body portion.

(3)

The sound output apparatus according to (2), in which the fingerprint sensor is provided on a top surface of a side opposite to a direction of insertion of the insertion portion into an earhole.

(4)

The sound output apparatus according to (3), in which the top surface is orthogonal to a central axis representing the direction of insertion of the insertion portion into an earhole.

(5)

The sound output apparatus according to (3), in which the top surface intersects with a central axis representing the direction of insertion of the insertion portion into an earhole at a predetermined angle.

(6)

The sound output apparatus according to any one of (3) to (5), including:

a communication antenna provided on the top surface.

(7)

The sound output apparatus according to (2), in which the body portion has a three-dimensional shape with a top surface of a side opposite to a direction of insertion of the insertion portion into an earhole as a bottom face, and the fingerprint sensor is provided on a side face of the three-dimensional shape.

(8)

The sound output apparatus according to (7), including:

a communication antenna provided on the top surface.

(9)

The sound output apparatus according to any one of (2) to (8), in which the fingerprint sensor is provided in a concave portion or on a convex portion of the body portion.

(10)

The sound output apparatus according to any one of (2) to (8), in which the body portion is provided with a convex portion to surround a periphery of the fingerprint sensor.

(11)

The sound output apparatus according to any one of (1) to (10), further including:

a database configured to register previously fingerprint information and a predetermined function in association with each other;

a fingerprint collation unit configured to collate the fingerprint information detected by the fingerprint sensor with the fingerprint information registered in the database; and a function execution unit configured to, in a case where the fingerprint information detected by the fingerprint sensor matches the fingerprint information registered in the database as a result of collation by the fingerprint collation unit, execute the predetermined function associated with the fingerprint information registered in the database.

(12)

The sound output apparatus according to (11), in which the predetermined function includes at least a function relating to output of sound.

(13)

The sound output apparatus according to (11) or (12), in which the database registers previously one piece of fingerprint information in association with a plurality of the predetermined functions, and the function execution unit, in a case where the fingerprint information detected by the fingerprint sensor matches the fingerprint information registered in the database as a result of collation by the fingerprint collation unit, executes a plurality of the predetermined functions associated with the fingerprint information registered in the database.

(14)

The sound output apparatus according to (11) or (12), in which the fingerprint collation unit recognizes whether the fingerprint information detected by the fingerprint sensor is left-hand fingerprint information or right-hand fingerprint information by collating the fingerprint information detected by the fingerprint sensor with the fingerprint information registered in the database, and the function execution unit executes a function of outputting sound for a left ear or sound for a right ear to an earhole depending on whether the fingerprint information detected by the fingerprint sensor is left-hand fingerprint information or right-hand fingerprint information on the basis of a result of collation by the fingerprint collation unit.

(15)

The sound output apparatus according to (14), including:

a gravity sensor, in which the function execution unit executes a function of outputting sound for a left ear or sound for a right ear to an earhole on the basis of information obtained from a direction of gravity detected by the gravity sensor.

(16)

A method of executing a function of a sound output apparatus, the method including:

registering previously fingerprint information and a predetermined function in association with each other in a database;

collating fingerprint information detected by a fingerprint sensor provided in the sound output apparatus configured to be inserted into an earhole with the fingerprint information registered in the database; and executing, in a case where the fingerprint information detected by the fingerprint sensor matches the fingerprint information registered in the database as a result of the collation, the predetermined function associated with the fingerprint information registered in the database.

(17)

A program causing a computer to function as:

a means for registering previously fingerprint information and a predetermined function in association with each other in a database;

a means for collating fingerprint information detected by a fingerprint sensor provided in a sound output apparatus configured to be inserted into an earhole with the fingerprint information registered in the database; and a means for executing, in a case where the fingerprint information detected by the fingerprint sensor matches the fingerprint information registered in the database as a result of the collation, the predetermined function associated with the fingerprint information registered in the database.

REFERENCE SIGNS LIST 100 sound output apparatus
102 body portion
102a top surface
104 earpiece
106 fingerprint sensor
108 communication antenna
116 fingerprint database
118 fingerprint collation unit
119 gravity sensor
130 function execution unit

The invention claimed is:

1. A sound output apparatus, comprising:
a database configured to register first fingerprint information in association with a function;
an insertion portion configured to output sound to an earhole, wherein the insertion portion is insertable into the earhole;
a fingerprint sensor configured to detect second fingerprint information; and
a central processing unit (CPU) configured to:
collate the detected second fingerprint information with the registered first fingerprint information;
determine, based on the collation, the detected second fingerprint information is one of left-hand fingerprint information or right-hand fingerprint information; and
execute the function, associated with the registered first fingerprint information, based on the determination that the detected second fingerprint information is one of the left-hand fingerprint information or the right-hand fingerprint information,
wherein the execution of the function corresponds to output of sound to the earhole of one of a left ear or a right ear.

2. The sound output apparatus according to claim 1, further comprising a body portion that extends from the insertion portion, wherein
the body portion is configured to be exposed to an outside of the earhole, and
the fingerprint sensor is in the body portion.

3. The sound output apparatus according to claim 2, wherein
the fingerprint sensor is on a top surface of a side of the body portion, and
the side of the body portion is opposite to a direction of insertion of the insertion portion into the earhole.

4. The sound output apparatus according to claim 3, wherein
the top surface is orthogonal to a central axis of the insertion portion, and
the central axis represents the direction of insertion of the insertion portion into the earhole.

5. The sound output apparatus according to claim 3, wherein
the top surface intersects with a central axis of the insertion portion at a specific angle, and
the central axis represents the direction of insertion of the insertion portion into the earhole.

6. The sound output apparatus according to claim 3, further comprising a communication antenna on the top surface.

7. The sound output apparatus according to claim 2, wherein
the body portion has a three-dimensional shape with a top surface of a side of the body portion as a bottom face,
the side is opposite to a direction of insertion of the insertion portion into the earhole, and
the fingerprint sensor is on a side face of the three-dimensional shape.

8. The sound output apparatus according to claim 7, further comprising a communication antenna on the top surface.

9. The sound output apparatus according to claim 2, wherein the fingerprint sensor is one of in a concave portion or on a convex portion of the body portion.

10. The sound output apparatus according to claim 2, wherein
the body portion includes a convex portion, and
the convex portion surrounds a periphery of the fingerprint sensor.

11. The sound output apparatus according to claim 1, wherein
the database is further configured to register one piece of third fingerprint information in association with a plurality of functions, and
the CPU is further configured to:
determine the detected second fingerprint information matches the registered one piece of third fingerprint information; and
execute the plurality of functions, associated with the registered one piece of third fingerprint information, based on the determination that the detected second fingerprint information matches the registered one piece of third fingerprint information.

12. The sound output apparatus according to claim 1, further comprising a gravity sensor configured to detect a direction of gravity,
wherein the CPU is further configured to execute the function based on information associated with the direction of gravity.

13. A method, comprising:
in a sound output apparatus including a database, a fingerprint sensor, and a central processing unit (CPU), wherein the sound output apparatus is insertable into an earhole:
registering, in the database, first fingerprint information in association with a function;
detecting second fingerprint information by the fingerprint sensor;
collating, by the CPU, the detected second fingerprint information with the registered first fingerprint information;
determining, by the CPU, the detected second fingerprint information is one of left-hand fingerprint information or right-hand fingerprint information, based on the collation; and
executing, by the CPU, the function associated with the registered first fingerprint information, based on the determination that the detected second fingerprint information is one of the left-hand fingerprint information or the right-hand fingerprint information,
wherein the execution of the function corresponds to output of sound to the earhole of one of a left ear or a right ear.

14. A non-transitory computer-readable medium having stored thereon, computer-executable instructions which when executed by a processor, cause the processor to execute operations, the operations comprising:
- registering, in a database, first fingerprint information in association with a function;
- detecting second fingerprint information by a fingerprint sensor, wherein
  - a sound output apparatus includes the fingerprint sensor, and
  - the sound output apparatus is insertable into an earhole;
- collating the detected second fingerprint information with the registered first fingerprint information;
- determining, based on the collation, the detected second fingerprint information is one of left-hand fingerprint information or right-hand fingerprint information; and
- executing the function, associated with the registered first fingerprint information, based on the determination that the detected second fingerprint information is one of the left-hand fingerprint information or the right-hand fingerprint information,
- wherein the execution of the function corresponds to output of sound to the earhole of one of a left ear or a right ear.

* * * * *